No. 812,698. PATENTED FEB. 13, 1906.
T. STERNÉ.
ELASTIC TIRE FOR VEHICLE WHEELS.
APPLICATION FILED JUNE 23, 1905.

UNITED STATES PATENT OFFICE.

THEODORE STERNÉ, OF PARIS, FRANCE.

ELASTIC TIRE FOR VEHICLE-WHEELS.

No. 812,698.

Specification of Letters Patent.

Patented Feb. 13, 1906.

Application filed June 23, 1905. Serial No. 266,657.

*To all whom it may concern:*

Be it known that I, THEODORE STERNÉ, civil engineer, a subject of His Majesty the Emperor of Austria-Hungary, residing at 182 Rue de Rivoli, Paris, France, have invented new and useful Improvements in Elastic Tires for Wheels of Vehicles, of which the following is a specification.

The present invention, which relates to elastic tires for vehicle-wheels generally, but more particularly for wheels of motor-cars, refers more especially to the kind of tire described in my English Patent No. 13,286, dated June 29, 1901—that is to say, consisting of a series of metallic springs surrounded by a covering of india-rubber, leather, or any other impermeable material which may serve as a protection against moisture, dust, or mud.

The invention pertains to an elastic tire of the above-mentioned kind which shall be stronger than those existing, shall be capable of supporting much heavier loads without any risk of detrimental deformation or breaking, while affording the degree of elasticity which characterizes the kind of tire in question.

Figure 1:
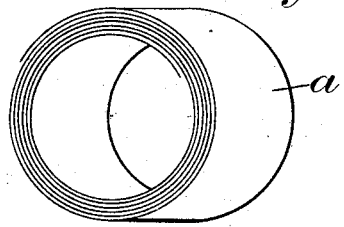
Figure 2:
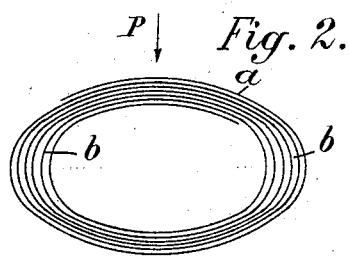
Figure 3:
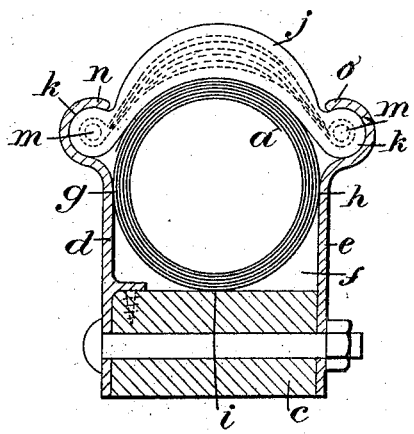
Figure 4:
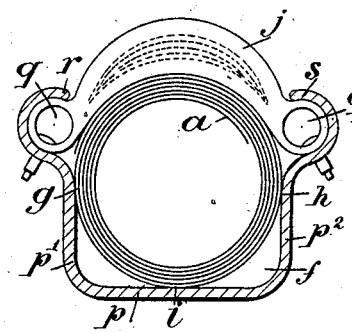
Figure 5:
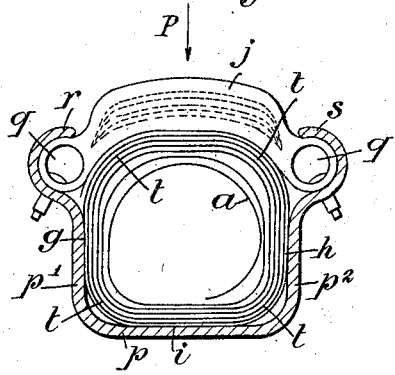

In the accompanying drawings, Figure 1 is a perspective view of one of the elementary springs similar to those described in the above-mentioned patent and forming part of the construction of the tire described in the present invention. Fig. 2 shows in a somewhat exaggerated manner the position which the concentric spires will take in a spiral spring in which the spires are in contact, as shown in Fig. 1, when a sharp spontaneous pressure is brought to bear upon the spring in a vertical sense and the spring is left loose or simply surrounded by a supple covering by which it is not rigidly inclosed. Fig. 3 is a vertical section of a tire according to the present invention, with similar elementary springs to those shown in Fig. 1. Fig. 4 is a view similar to Fig. 3, showing a somewhat different arrangement devised according to the same principle. Fig. 5 is a similar view to Fig. 4, showing in what manner the elementary spring of this new device works and the form which it takes when subjected to a compression which is analogous to the compression it receives when the tire is in use and bears upon the ground.

As in the device referred to in the above-mentioned prior patent, the present tire is essentially constituted by a series of spirally-wound elastic lamina $a$, Fig. 1, the spires of which touch each other, the two ends being free and the springs being placed end to end round the felly of the wheel, touching each other, although independent of one another. In the previous arrangement these springs are kept on the felly by a simple flexible covering which does not impede their lateral extension. When the tire is in use, the springs therefore on coming in contact with the ground as the wheel revolves take a form approaching the one shown in Fig. 2, the different layers or spires of the steel sheet change their mutual position and move apart to a greater or less extent at points $b$, according to the degree of bending of the spring due to the stress of compression to which it is submitted by the load P, carried by the spring. It is this successive momentary deformation of the several springs which imparts great flexibility to the tire, the effect of which is quite comparable to that of the ordinary pneumatic tire. Now in certain cases, notably for heavy vehicles or vehicles having to carry heavy loads, it may be of advantage to reduce this flexibility while yet allowing the tire to retain its desirable elasticity. In this manner too considerable a bending or flattening at the point of contact with the ground is avoided without having recourse to springs which are too rigid. This is the aim to which the arrangement which constitutes the present invention points.

One instance of the invention is shown in Fig. 3 of the accompanying drawings. In this arrangement the felly $c$ of the wheel is provided with lateral flanges $d\ e$, of which $d$ may be fixed permanently to the felly, the other one, $e$, being movable and capable of being removed from the felly for putting on the tire or removing the same. These flanges $d\ e$ form a deep groove $f$ of practically rectangular cross-section round the felly $c$. In this groove the elementary springs $a$ are lodged, which are similar to the one shown in Fig. 1 and are laterally held fast by the said flanges, against which they press at points $g\ h$, while at the bottom of the groove $f$ they rest at $i$ on the felly $c$. The springs $a$ are kept in the groove $f$ on the felly $c$ by means of an exterior impermeable covering $j$, of leather, india-rubber, impermeable tissue, or any other appropriate material, fixed to the felly by any means whatsoever. In Fig. 3 this covering $j$ is shown, by way of example, provided with heel-pieces $k$, which may be provided with rods $m$, as is usual, and engage hooked flanges $n$ $o$ of the cheeks $d$ $e$. In the arrangement of Fig. 4 the groove $f$ instead of being formed as in the preceding case by independent flanges fixed to the felly of the wheel is made of a metallic hoop $p$, suitably formed to represent a groove $f$ of practically rectangular cross-section, the hoop being fixed to the felly of the wheel in the usual way or in any suitable manner. As in the preceding case, the springs $a$ bear with their sides at $g$ $h$ against the walls $p'p^2$ of the hoop $p$, and at $i$ they rest on the bottom of the groove $f$ of the hoop. The impermeable covering $j$ may, for instance, be kept on the felly, as in the device described in my French Patent No. 346,601, dated September 27, 1904, by means of inflatable heel-pieces $q$ engaging the recesses $r$ $s$ of the curved walls $p'p^2$ of the hoop $p$. In both these arrangements when the elementary spring $a$ is subjected to a load P, Fig. 5, it relinquishes the cylindrical form shown in Fig. 1, as well as in Figs. 3 and 4, and approaches as it is supported at the sides at $g$ $h$ a rectangular form with rounded corners $t$, Fig. 5. The concentric layers of the spring glide over each other and remain in contact at the points at which they are supported—as, for instance, at $g$ $h$ $i$—and move apart at the points at which they are not supported. In consequence thereof the spring $a$ rolls up, and it is to this rolling up that the flexibility of the spring is due. It is readily seen that this flexibility affords the required elasticity of the tire without the risk of too considerable a flattening of the tire at the point of contact with the ground due to a heavy load on sudden pressure.

For the purpose of preventing the metallic springs, which are a constituent part of the tire, from cutting into the covering of india-rubber, leather, or other impermeable matter applied to protect the springs against moisture, dust, or mud a layer of wadding, stuffing, oakum, or other appropriate fibrous or other material which is neither woven nor spun is interposed. The stuffing may consist of carded or non-carded fibers of cotton, hemp, the grass-cloth plant, jute, or of camel-hair, &c. This material can be used in the form of a strip or continuous layer on the interior of the covering, the latter being protected by this material from being cut, owing to the resistance which the material presents to the more or less sharp edges of the exterior spires of the metallic springs inclosed in the covering. If it is found suitable, each spring may be entirely or partly surrounded by a layer of said fibrous material, the material being applied in any manner whatsoever.

What I claim as my invention, and desire to secure by Letters Patent, is—

1. The combination with a wheel, of a resilient tread member therefor, cylindrical cushioning means interposed between the felly of the wheel and said tread member, and rigid means engaging said cushioning member on opposite sides thereof at points intermediate of the felly of the wheel and said tread member, substantially as described.

2. The combination with a wheel, of a resilient tread member therefor, cylindrical cushioning means interposed between the wheel-felly and said tread member, and means for preventing the lateral expansion of said cushioning member substantially on the horizontal axis thereof, substantially as described.

3. The combination with a wheel provided with a peripheral channel having rigid side walls, of a resilient cover or tread member for said channel, and a series of spirally-wound springs interposed, within said channel, between said tread member and the felly of the wheel and tangentially engaging said side walls, substantially as described.

4. The combination with a wheel provided with an annular peripheral channel having rigid side walls, of a resilient tread member covering said channel, and a series of spirally-wound springs interposed, within said channel, between said tread member and the felly of the wheel and contacting said rigid side walls, substantially as described.

5. The combination with a wheel, of annularly-disposed rigid plates projecting peripherally of the felly of said wheel and forming an annular chamber therearound, a resilient tread member connecting the ends of said plates, and a series of spirally-wound springs interposed, within said chamber, between said tread member and felly and contacting said rigid plates, substantially as described.

6. The combination with a wheel, of peripherally-disposed rigid plates forming an annular chamber therearound, said plates being provided with interlocking socket-flanges at their ends, a resilient tread member provided with heels adapted to fit within said socket-flanges, and a series of spirally-wound springs interposed between said plates, tread member, and the felly of the wheel and contacting said rigid plates, substantially as described.

7. The combination with a wheel, of peripherally-extending rigid plates forming an annular chamber therearound, hooked flanged sockets extending around the outer edge of said plates, a flexible tread member provided with heels adapted to engage said sockets, means for securing same therein, and a series of spirally-wound springs interposed, within said chamber, between said tread member and the felly of the wheel and contacting said rigid plates, substantially as described.

8. The combination with a wheel, of a pair of peripherally-disposed rigid plates provided with socketed ends and forming an annular chamber around said wheel, a resilient tread member having heels thereon adapted to fit within said sockets and provided with an air-chamber, means for inflating said air-chambers for interlocking said tread member with said plates, and spirally-wound springs interposed, within said annular chamber, between said tread member and wheel-felly and contacting said rigid plates, substantially as described.

In testimony whereof I have signed my name to this specification in the presence of two subscribing witnesses.

THEODORE STERNÉ.

Witnesses:
R. H. BRANDON,
LOUIS RINURE.